(12) United States Patent
Blum et al.

(10) Patent No.: US 10,883,800 B2
(45) Date of Patent: Jan. 5, 2021

(54) CAMOUFLAGE SYSTEM AND METHOD OF CAMOUFLAGING AN OBJECT

(71) Applicant: Fibrotex Technologies Ltd., Petach Tikva (IL)

(72) Inventors: Adi Blum, Herzliya (IL); Itai Gomer, Hod-Hasharon (IL)

(73) Assignee: FIBROTEX TECHNOLOGIES LTD., Petach Tikva (IL)

( * ) Notice: Subject to any disclaimer, the term of this patent is extended or adjusted under 35 U.S.C. 154(b) by 329 days.

(21) Appl. No.: 15/777,911

(22) PCT Filed: Nov. 22, 2015

(86) PCT No.: PCT/IL2015/051123
§ 371 (c)(1),
(2) Date: May 22, 2018

(87) PCT Pub. No.: WO2017/085706
PCT Pub. Date: May 26, 2017

(65) Prior Publication Data
US 2018/0340757 A1 Nov. 29, 2018

(51) Int. Cl.
*F41H 3/02* (2006.01)
*G02B 5/09* (2006.01)

(52) U.S. Cl.
CPC ........ *F41H 3/02* (2013.01); *G02B 5/09* (2013.01)

(58) Field of Classification Search
CPC .................................. F41H 3/02; G02B 5/09
USPC ......................................... 359/839, 850, 855
See application file for complete search history.

(56) References Cited

U.S. PATENT DOCUMENTS

| 5,142,833 | A |  | 9/1992 | Svehaug | |
|---|---|---|---|---|---|
| 5,373,863 | A | * | 12/1994 | Prizio | A01M 31/025 135/117 |
| 5,377,711 | A | * | 1/1995 | Mueller | E04H 15/001 135/115 |
| 5,592,960 | A | * | 1/1997 | Williams | E04H 15/001 135/87 |
| 6,613,420 | B1 |  | 9/2003 | Leupolz | |
| 8,360,587 | B2 | * | 1/2013 | Lewis, Jr. | A01M 31/025 359/871 |

(Continued)

FOREIGN PATENT DOCUMENTS

WO  WO 2007/084148    7/2007

OTHER PUBLICATIONS

International Search Report of Application No. PCT/IL2015/051123 dated Feb. 24, 2016.

*Primary Examiner* — Ricky D Shafer
(74) *Attorney, Agent, or Firm* — Pearl Cohen Zedek Latzer Baratz LLP

(57) ABSTRACT

A camouflage system for thermal and visual camouflage of a movable object comprising at least two frames and a plurality of reflective elements connected to each of the at least two frames, each of the reflective elements is made of a reflective material having a reflectivity of at least 90 percent in the electromagnetic (EM) wave length range of 3-12 microns and all of the reflective panels are positioned in a predefined angle with respect to a vertical axis, wherein the predefined angle is in the range of 6 to 25 degrees so that when installed on the object an upper part of each of the reflective panels is more distant from the camouflaged object than a lower part of the same reflective panel.

18 Claims, 8 Drawing Sheets

(56) References Cited

U.S. PATENT DOCUMENTS

| | | | |
|---|---|---|---|
| 8,916,265 B1 | 12/2014 | Kelsey | |
| 2003/0098108 A1* | 5/2003 | Littlefield | A45F 4/02 150/106 |
| 2007/0006909 A1* | 1/2007 | Lewis | A01M 31/025 135/115 |
| 2008/0144203 A1* | 6/2008 | Williams | A01M 31/025 359/866 |
| 2010/0232029 A1 | 9/2010 | Lewis, Jr. | |

* cited by examiner

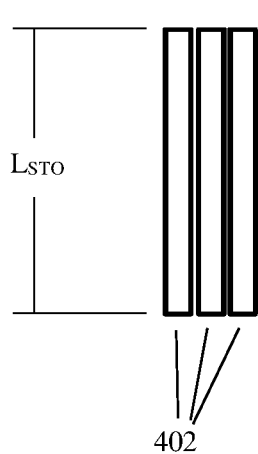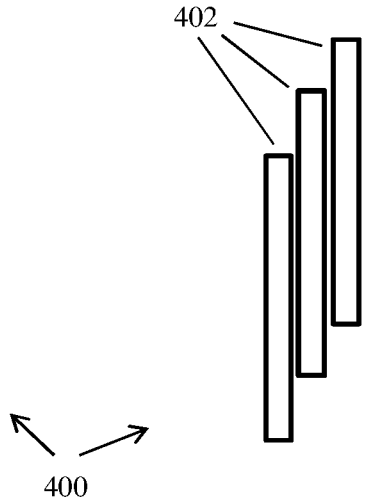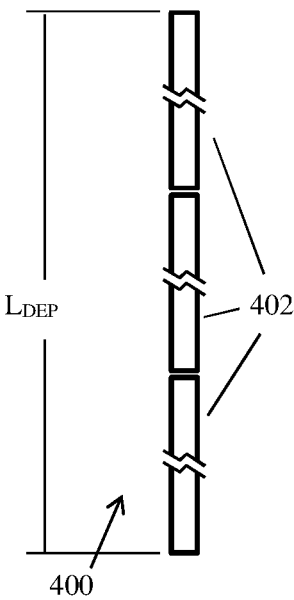
Fig. 4A   Fig. 4B   Fig. 4C
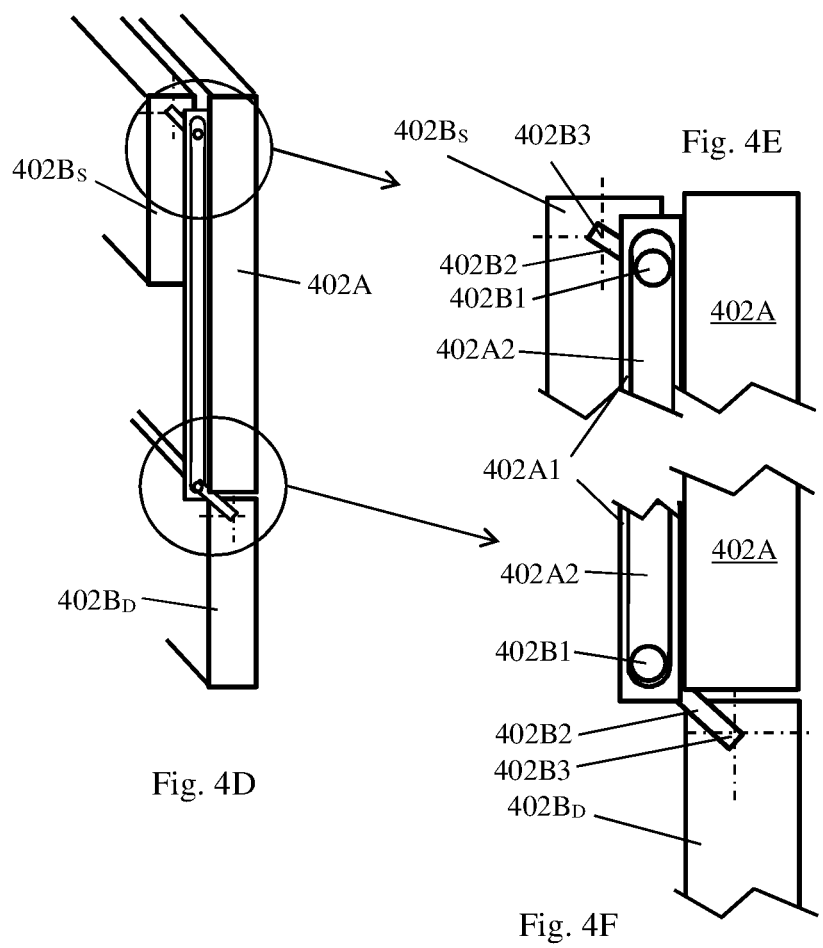
Fig. 4D   Fig. 4E   Fig. 4F

CAMOUFLAGE SYSTEM AND METHOD OF CAMOUFLAGING AN OBJECT

CROSS-REFERENCE TO RELATED APPLICATIONS

This application is a National Phase Application of PCT International Application No. PCT/IL2015/051123, International Filing Date Nov. 22, 2012, which is hereby incorporated by reference.

BACKGROUND OF THE INVENTION

Various techniques for camouflaging objects, such as people (e.g. hunters, infantry soldiers etc.), vehicles (such as military vehicles) and facilities, are well known in the art. One type of camouflage utilizes a fabric such as camouflage net to completely cover or hide the object to be camouflaged. Other techniques disguise the shape of the object by breaking up the lines which define the shape of the object.

A more advanced camouflage technique known in the art is using a plurality of panels with a reflective outer face. The panels are connected to form a structure with the reflective faces of the panels facing outward of the structure and inclined toward the surface upon which the structure rests, so that the panels reflect an image of the immediate foreground to a distant observer looking toward the structure, thereby camouflaging the structure.

However, all known camouflage techniques are limited to camouflaging static objects or may be used only when the camouflaged object is at rest. Further, known camouflage solutions may not change state from stowed (un-camouflaged state) to deployed state in an effective and speedy manner, especially in combat field conditions that require easy, quick and effective deployment of the camouflage. Moreover, prior-art camouflage solutions attempting to reduce IR print require investment of large amount of energy (e.g. energy consumed for reducing the temperature of the camouflaged object by absorption of heat produced by heat-sources using cooling systems). In such solutions the mere use of active cooling systems produces additional heat radiation which requires additional efforts to remove this IR print. Still further, where camouflage of the known art uses reflective elements to camouflage an object, these reflective elements are operable in the visual range of wavelengths but fail to provide reflectivity in the Infrared (IR) range of wavelengths, and more specifically in the thermal radiation wavelength ranges where known thermal imaging equipment is operable, for example in the middle wave infrared (MWIR) range of substantially 3-5 microns and in the long wave infrared range (LWIR) of substantially 8-14 microns, thus leaving the object exposed to a viewer using such thermal imaging means.

Apart from the need to reflect radiation in the MWIR and LWIR ranges, there is also a need to minimize the thermal fingerprint of hot spots in the camouflaged vehicle such as the engine, the cooling system and the exhaust tube and outlet, as may be viewed by a viewer located outside and away from the vehicle.

SUMMARY OF THE INVENTION

A camouflage system for thermal and visual camouflage of a movable object comprising at least two frames and a plurality of reflective elements connected to each of the at least two frames. Each of the reflective elements may comprise reflective material disposed on at least one side of the reflective element and may have reflectivity of at least 85 percent in the visual range and preferably at least 95 percent, and reflectivity in the electromagnetic (EM) wave length range of 3-5 and 8-14 microns of at least 80 percent and preferably at least 90 percent. All of the reflective panels may be positioned in a predefined angle with respect to a vertical plane so that the upper edge of each panel is more remote from the object than the lower edge of that panel, the predefined angle is in the range of 6 to 25 degrees.

According to embodiments of the present invention the camouflage system may be further adapted to be in a stowed position and in a deployed position, wherein at least one frame of the at least two frames is configured to change its relative position with respect to the second frame to increase the overlapping areas of the first and second frames in the stowed position and to decrease the overlapping area of the first and second frames in the deployed position. The reflective elements may be rigid panels.

According to embodiments of the invention the camouflage system is movable with the object when the object moves, and the predefined angle is adapted to maintain reflection of the nearby ground to a remote viewer when the object is moving.

According to embodiments of the invention the total seeable area of the face of the camouflage system that is facing away from the camouflaged object in a stowed position is between 0.2 and 0.7 of the total seeable area of the face of the camouflage system in a deployed position.

According to embodiments of the invention the camouflage system may comprise a folding and deploying mechanism, adapted to change the relative position of at least the first frame with respect to at least the second frame.

According to yet further embodiments of the invention the stowing and deploying mechanism may comprise two guiding rails disposed each one along one of the sides of the at least some of the at least two frames, and two rollers disposed each one on each of the sides of the at least some of the at least two frames, each of the rollers is adapted to roll along a corresponding rail of an adjacent frame, allowing each frame to be guided into a stowed position or into a deployed position with respect to an adjacent frame

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 4A-4C are schematic illustrations of a set of camouflage elements in stowed position, in an intermittent position and in deployed position, respectively, seen in a side view, according to embodiments of the present invention;

FIGS. 4D-4G are schematic illustrations of an assembly for enabling stowing and deployment of camouflage elements, according to embodiments of the present invention;

Figure 1:
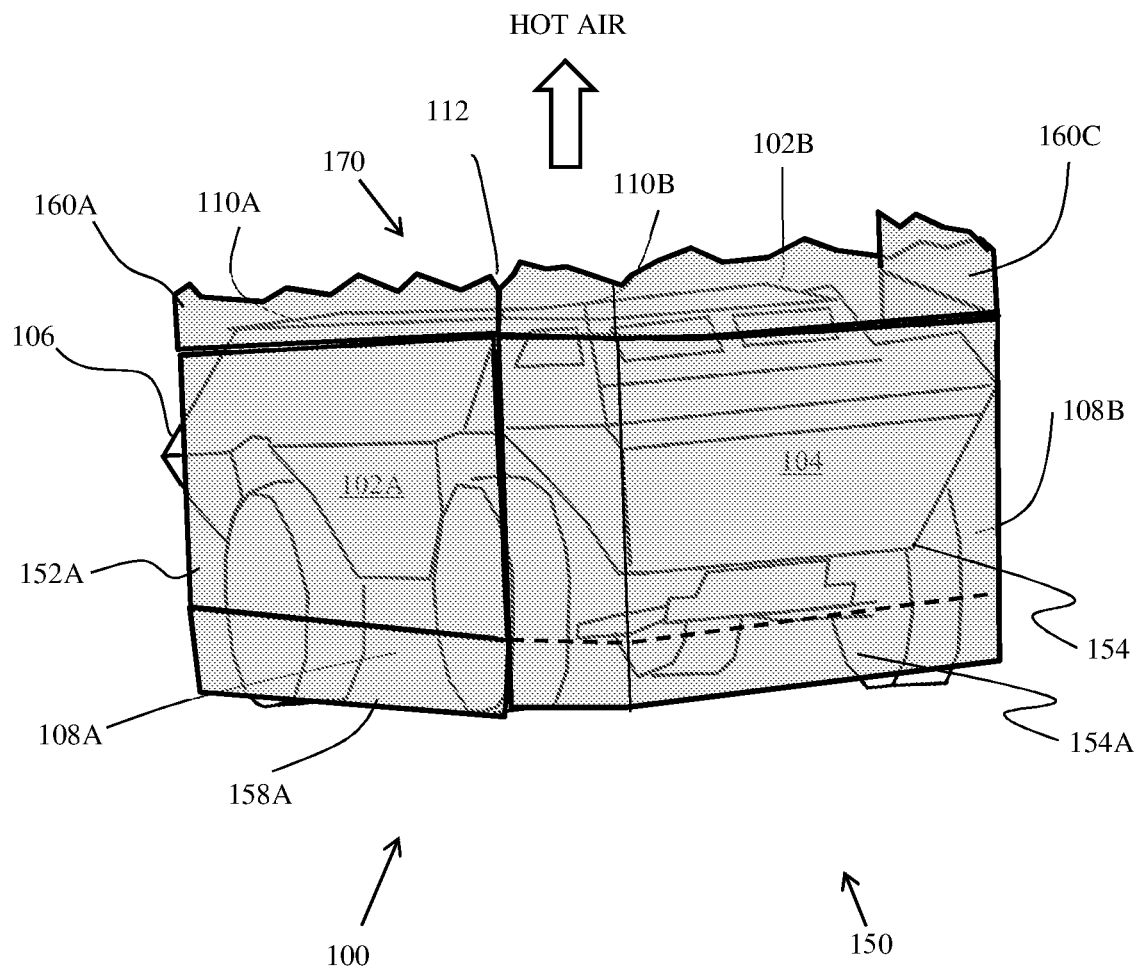
FIG. 1 schematically presents a vehicle and elements of a camouflage for the vehicle, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is made now to FIG. 1 which schematically presents a vehicle 100 and elements of a camouflage system 150 for the vehicle, according to embodiments of the present invention. Camouflage system 150 is adapted to surround a camouflaged vehicle and provide reflection of thermal and visual radiation capabilities thereby presenting to a viewer positioned remotely from the vehicle, reflected image of the ground surrounding vehicle 100 thereby camouflaging vehicle 100. The reflection provided by the surfaces of camouflage system 150 may be in the visual wavelength range or in the thermal ranges MWIR and LWIR, which typically may be viewed using a thermal imaging device. Camouflage system 150 may further be adapted to prevent, or at least substantially minimize the amount of thermal radiation emitted by vehicle 100 to the outside of camouflage system 150. This may be achieved, for example, by allowing most of the heat radiated inside camouflage system 150 to ventilate upwardly through the upper opening 170 of camouflage system 150, thereby taking advantage of the fact that hot air has minimal thermal fingerprint that may be imaged by a thermal imaging device, as long as there is no substantial amount of particles of substance (e.g. vapor droplets, dust and the like) above the ventilation opening 170 that may be heated by the ventilating hot air and therefore may be visible to a thermal imaging device. Further, in portions of the envelope of camouflage system 150 that are located close to specific hot parts, such as the vehicle engine, the engine cooling system or the engine exhaust tubing, heat resistive/isolating material may be disposed over the inner face of the envelope of camouflage system 150 to minimize transfer of heat through the side faces of envelope 150.

Camouflage system 150 may be designed to allow easy and rapid deployment and stowing of at least portions of camouflage system 150, to enable quick adaptation of vehicle 100 to changing conditions in a battle field. for example, when the probability for an hostile observer to be present in the battle field is low, portions of the camouflage system may be stowed thereby enabling faster and more flexible movement of the vehicle and when exposure of the vehicle to an hostile observer need to be minimized such stowed portions may be deployed easily and quickly thereby allowing quick adaptation to changing conditions.

Vehicle 100 may be defined, for the purpose of camouflaging it, by defining its facets that need to be covered or camouflaged, as well as facets or sides that need to be left not covered or need to allow see-through. Vehicle 100 may have main right side portion 102A, main left side 102B, lower right side 108A, lower left side 108B (not shown in this drawing), upper right side portion 110A, upper left side portion 110B, front portion 104 and rear side 106. According to embodiments of the invention a camouflage system assembly 150 may be partitioned into elements, for example elements that match, or that are adapted to be positioned against corresponding portions of vehicle 100. Camouflage element of the main right side 152A may be adapted to be positioned close to and against main right side portion 102A and so on. The following Table 1 matches camouflage element numbers to corresponding portions of vehicle 100. This partition is made mainly for the sake of clarity and ease of description. It will be apparent that camouflage system assembly 150 may be partitioned differently or may not be partitioned at all, without diverting from the scope of the invention.

TABLE 1

| Vehicle 100 elements | Camouflage 150 elements | Description |
|---|---|---|
| 102A | 152A | Main right side |
| 102B | 152B | Main left side |
| 104 | 154 | Front |
| 106 | 156 | Rear |
| 108A | 158A | Lower right side |
| 108B | 158B | Lower left side |
| 110A | 160A | Upper right side |
| 110B | 160B | Upper left side |
| 104 | 154 | Front |
|  | 154A | Lower front |
|  | 160C | Upper front |
| 112 | 170 | Top of vehicle |

It will be apparent that elements of the camouflage system assembly 150 need not match exactly corresponding vehicle elements and that partition of the camouflage to elements may be done firstly for the sake of convenience of production, deployment or stowing, as may be the case.

According to embodiments of the present invention high attention to camouflaging is given to the sides of the vehicle, because typically in a battle field, the sides of the vehicle are the typical facets which one may wish to camouflage, as the sides of a vehicle are the main facets that become visible, either to the eye and/or to field-glasses, in the visible range of wavelengths, or to a thermal or infra-red (IR) imaging device in the IR range, and more specifically to imaging devices useable in military applications, in the MWIR and LWIR wavelength ranges.

In a search for adequate materials that will provide high thermal reflectivity with sufficient mechanical and physical features, such as weather durability and flexibility the inventors of the present invention defined the following requirements from the thermal reflective material: total reflectance higher than 85% and preferably higher than 95%, weighted specular reflectance higher than 80% and preferably higher than 90% (as measured according to the Solar PACES Task III guidelines) for the LWIR and MWIR wavelength ranges and preferably for the 3-5 micron and 8-14 micron wavelength ranges. The performance requirements of materials that may be used for camouflage according to embodiments of the present invention are presented in table 2:

TABLE 2

| | |
|---|---|
| Total reflectance | >85% |
| | >95% (preferred) |
| Weighted Specular Reflectance | >80% |
| [for LWIR/MWIR wavelength ranges] | >90% (preferred) |
| [preferably for the ranges of 3-5 and 8-14 microns] | |

Materials with such performance may ensure high thermal reflectivity that will provide excellent thermal camouflaging when used for reflecting the ground nearby the camouflaged vehicle.

Figure 2:
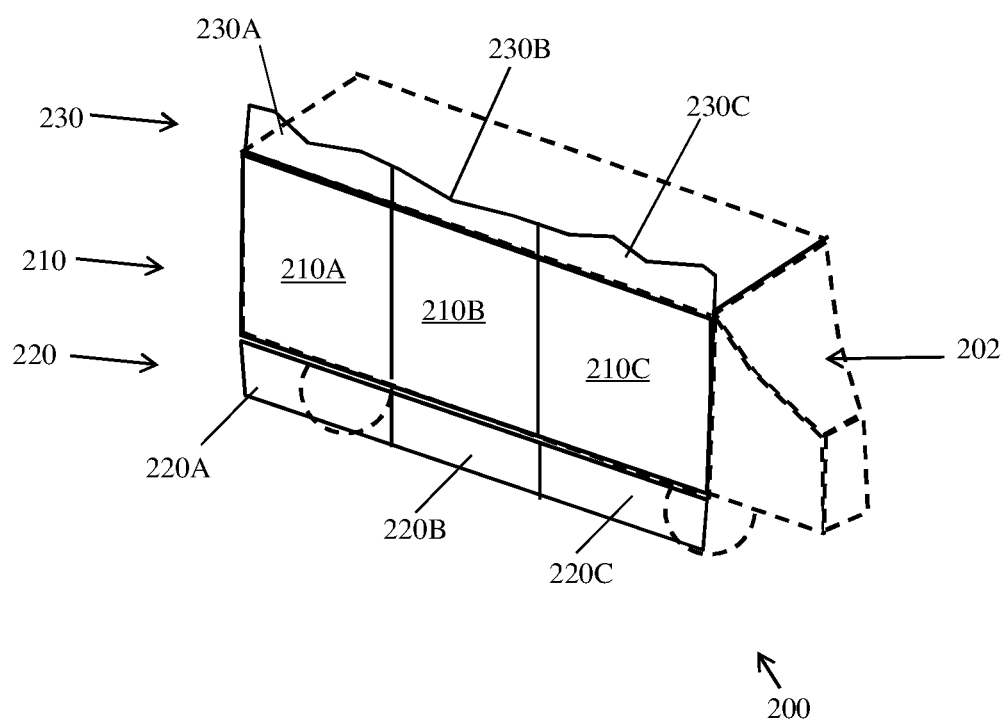
FIG. 2 is a schematic illustration of a vehicle shown in a 3D illustration, depicting the various camouflaging requirements from camouflage suit providing camouflage to one side of a vehicle, according to embodiments of the present invention.

Reference is made now to FIG. 2, which is a schematic illustration of vehicle 202 shown in a 3D illustration, depicting the various camouflaging requirements from camouflage system 200 providing camouflage to one side of a vehicle, according to embodiments of the present invention. Side camouflage system 200 may be adapted to provide maximal camouflage coverage to the side of a vehicle and be adapted to provide easy to deploy and easy to stow assembly that when deployed provides camouflage to the respective facet of the vehicle in the visible and thermal range of wavelengths. Each facet of camouflage system 200 may be camouflaged using a main facet section 210 (e.g. 210-1, 210-2, etc.). For the sake of clarity the following description will refer to only one representative main facet section. Main facet section 210 of assembly 200 may comprise plurality of reflecting elements (not shown) adapted to reflect visible light and electromagnetic radiation in the thermal range and specifically in the wavelength ranges of MWIR (e.g. 3-5 microns) and in the LWIR range (e.g. 8-14 microns), that are directed so as to cause reflection of the ground from the reflecting elements disposed substantially around the vehicle to a remote viewer located away from the vehicle. The reflecting elements may be equipped with layer of material with high reflectance figure in the visible wavelength range and in the thermal MWIR and LWIR wavelength ranges. Each main section 210 may be partitioned into sub-sections, for example into sub-sections 210A, 210B and 210C which may be partitioned side-by-side in the example of FIG. 2, one above the other (not shown) or in a combination thereof. The partition may be required to enable easy stowing of the main facet section into relatively small packages when not deployed and easy deployment when turning into operational state. The camouflage in main facet section 210 may be made of light and at least semi-rigid or rigid thin material, adapted to provide the required rigidity for supporting light reflecting coating so that the reflection will not be too distorted in order not to divert the reflected image from a reasonable look of the close ground aside the vehicle.

Each sub-section 210A-210C may be made of a series of thin plates that may be directed, each, in the same reflection direction, e.g. their planes may be parallel to each other when deployed and may be located next to each other to form a continuous reflecting area where the plates may slightly overlap each its adjacent plate. In embodiments of the invention when each sub-section 210A-210C is in its stowed state, at least some of the reflecting plates may be positioned on top of each other with high overlapping figure, thus allowing stowing such sub-section in a volume with smaller area compared to that of the deployed area. Embodiments enabling such stowing and deployment are discussed in details below.

Lower side camouflage section 220 may be made of a flexible sheet that will allow coverage from the top of the section, that extends from the bottom of the respective main facet section 210, to the ground underneath it, even when the distance between the top of the section and the ground changes rapidly, for example during operational conditions. Lower side section 220 may be made of a thin sheet of cloth or insulating plastic and may be covered, e.g. painted with thermal and visual reflecting and/or absorbing type of material so as to reflect to remote viewer reflections of the texture of the surrounding soil. Inter alia the role of lower section 220 is to block IR leakage stemming from the heat produced by, for example, by the operating engine of the vehicle. It will be noted that the partition of lower section 220 should not necessarily follow the partition of main section 210 and may be done so as to meet convenience of deployment, of production or of stowing, as the case may be.

Upper section 230 may be directed mainly to conceal the upper typically straight lines of a vehicle, which become highly visible/noticeable in a battle field. Upper section 230 may also be equipped with reflective layer and may be directed to reflect to remote viewer the ground in the vicinity of the camouflaged vehicle, thus completing the camouflage suit for the respective facet of the vehicle. The upper line of upper section 230 should be cut along changing curves along the upper line of upper section 230, simply to avoid existence of straight lines there. Upper section 230 may also be partitioned into sub-sections, such as sub-sections 230A-230C yet it will be apparent that this partition may be carried out in different patterns of sectioning.

While the lower section 220 and the upper section 230 may be relatively narrow and light weight installations that may not need be capable of folding or stowing when not in use and be capable of deploying when in need, typically the main section 210 may need to be adapted to be folded or stowed when not in use, and further be adapted to be easily deployed when in need.

Further, the following guidelines are followed in embodiments of the present invention, in order to eliminate the visibility of the vehicle in the battlefield. First, the image of the vehicle, in the visible wavelength range and in the thermal ranges of MWIR and LWIR, is minimized using surfaces of electromagnetic radiation reflecting or mirroring covers or coatings, adapted to have high reflectance figures in the required wavelength ranges. The reflecting surfaces may be disposed so as to reflect to a viewer that is located in the battle field when looking at the camouflaged vehicle, reflections of the surface of the ground next to the vehicle, while blocking the line of sight to the vehicle thus presenting to that viewer an image of the close ground, which may appear as natural extension of the ground at the location where the vehicle is. Typically the reflecting surfaces are tilted so that ground at the area surrounding the vehicle in a range of few meters from the vehicle is reflected towards the remote viewer. Such basic camouflaging method is highly desired for a moving vehicle, since the image reflected to a distant viewer is stationary with respect to the ground when the vehicle that is carrying the camouflage is moving, and the structure and textures which are reflected to the distance homogeneously unify with the immediate ground.

Some special attention in planning a camouflage suit, or system, for a vehicle according to embodiments of the present invention need to be given to the circumference of the vehicle next to the ground, where a flexible camouflage needs to be used due to changes in distance of the vehicle from the ground when travelling over bumpy ground. Special attention should also be given to the upper circumference of the vehicle, where it is desired to hide or conceal or mask the upper lines of the vehicle in order to eliminate the presence of non-natural lines in the nature's vicinity.

Figures 3A, 3B, 3C, 3D, 3E, 3F:
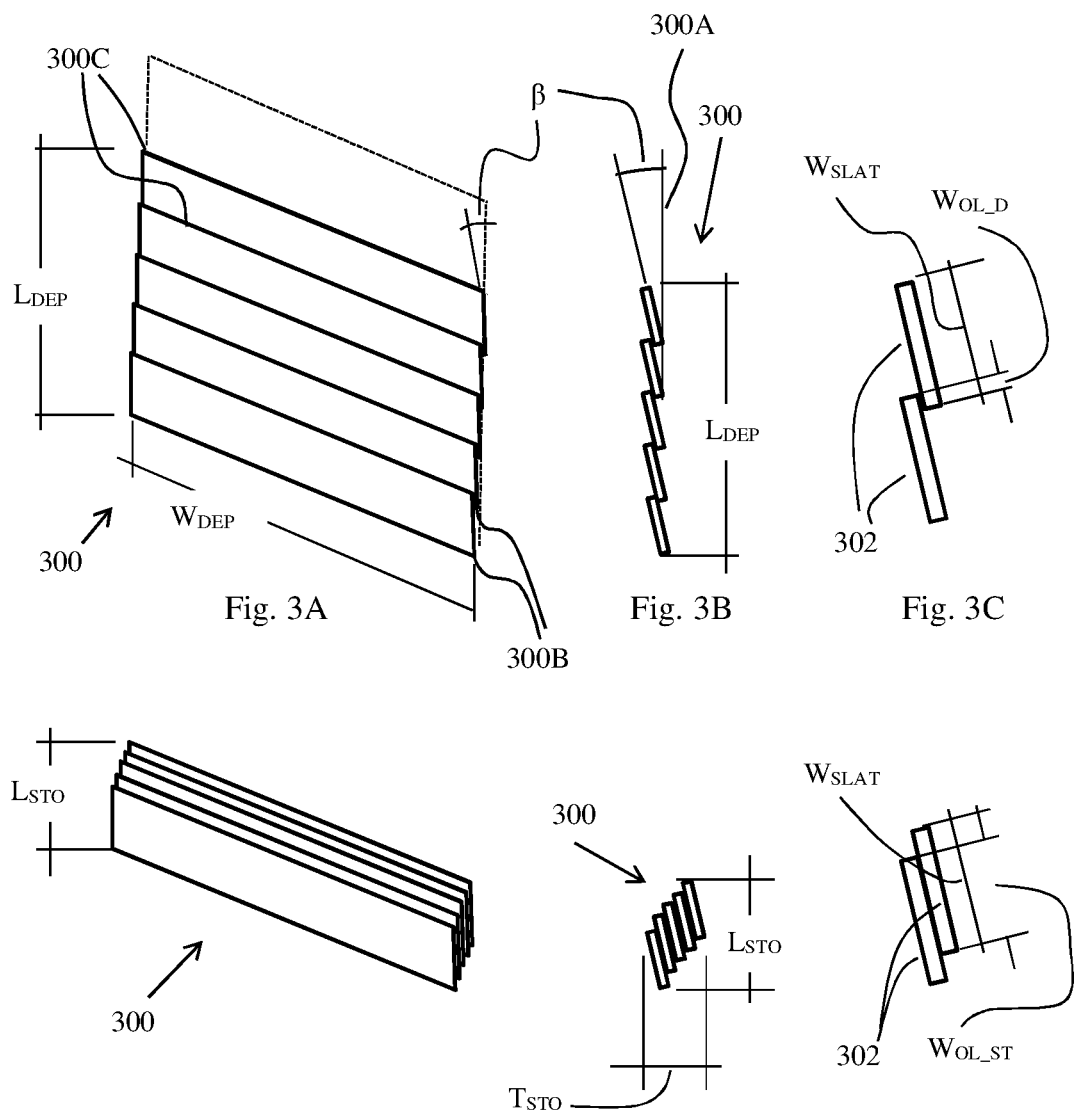
FIGS. 3A-3C depict various views of a deployed reflecting sub-section of a camouflage system, according to embodiments of the present invention.
FIGS. 3D-3F depict various views of a stowed reflecting sub-section of a camouflage system, according to embodiments of the present invention.

Reference is made now to FIGS. 3A-3C depicting various views of a deployed reflecting sub-section 300 and to FIGS. 3D-3F depicting various views of a stowed reflective sub-section, or frame 300, according to embodiments of the present invention. Reflecting sub-section 300 may comprise plurality of reflective elements or plates 302 adapted to be directed in an angle β with respect to the plane of sub-section 300. The plane of reflective sub-section 300, denoted 300A, may be defined as the plane comprising the longitudinal edges of reflective elements 302, either the lower longitudinal edges (denoted 300B as shown in FIGS. 3A, 3B) or the upper longitudinal edges (denoted 300C). Angle β may be in the range of 6-25°, as may be dictated by various parameters, such as the nature of the texture of ground where the camouflaged vehicle is planned to move, the estimated distance of the viewer from the camouflaged vehicle, etc. Reflective elements 302 may be made of a reflective material having a reflectivity of at least 90 percent in the electromagnetic (EM) wave length at least in the range of LWIR and MWIR, as detailed above. Such materials maybe one or more from the materials identified above, or equivalents. The reflective elements 302 may be rigid panels covered on at least one side with a reflective material.

When deployed, reflecting sub-section 300 may provide coverage of an area of $L_{DEP} \times W_{DEP}$ and the partial overlapping of one reflective element 302 over an adjacent reflective element 302 may be expressed by $W_{OL\_D}/W_{SLAT}$. When reflecting sub-section 300 is stowed, according to this embodiment it may occupy the volume of $L_{STO} \times W_{DEP} \times T_{STO}$. The feature of small stowing volume is essential for providing high operational performance to the vehicle when the camouflage system is not deployed. When reflecting sub-section 300 is in its stowed position the percentage of overlapping one reflective element 302 over an adjacent reflective element 302 may be expressed by $W_{OL\_ST}/W_{SLAT}$. The relative angle of the plurality of reflective elements 302 with respect to each other and with respect to the plane of sub-section 300 may be maintained using one of known mechanical solutions, in the deployed position, in the stowed position and during the transition from one to the other.

Figure 4G:
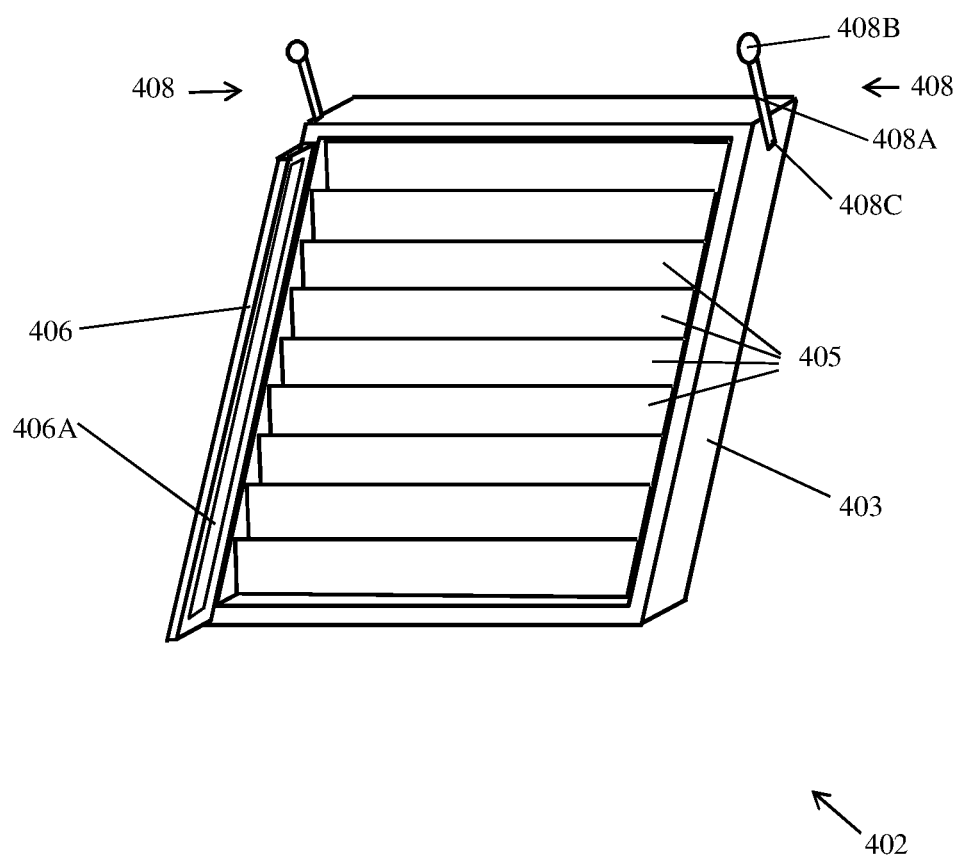

According to some embodiments of the present invention camouflaging of at least the sides and back side of a vehicle, e.g. facets 102A, 102B and 106, may be done using elements of a camouflage system each comprising plurality of reflecting units, where the reflecting units are disposed in a fixedly manner and in a desired inclined angle with respect to the ground in these elements of camouflage. Reference is made now to FIGS. 4A-4C, which are schematic illustration of set 400 of camouflage frames 402 in stowed position, in an intermittent position and in deployed position, respectively, seen in a side view, according to embodiments of the present invention. Camouflage frames 402 may comprise, each, a plurality of reflecting units. Two or more camouflage frames 402 may provide, when in deployed position, required camouflage coverage to a side or back side of a vehicle. As may be required by the specific dimension of a camouflaged vehicle, more than one set of camouflage frames 402 may be required to provide the required coverage. In such situation several sets of camouflage frames 402 may be disposed side-by-side. Use of camouflage frames 402 may be advantageous since it provides rigid camouflage element, in which each of the reflecting units is rigidly positioned with respect to its adjacent reflecting unit, thereby the overall reflective impression provided by each camouflage frames 402 is of high imaging quality. As depicted in FIGS. 4A-4C camouflage frames 402 may be stowed into a volume that is shorter than the fully extended deployed set of elements 400 by N, where N is the number of camouflage elements in set 400 of camouflage elements. The thickness of a stowed set 400 may be substantially N times thicker than the thickness of a single camouflage frame 402, and depending on the actual thickness of each camouflage frame 402, this may not exceed, according to embodiments of the invention, 40 cm for a set of three frames each having thickness of 10 cm. A facet that is to be camouflaged using sets 400 may dictate the number of sets to be used side-by-side, so that the resulting size, weight and operability meet battlefield requirements and constrains.

According to embodiments of the invention deployment of a set of camouflage frames, such as set 400, may be done using sets of sliding guides and sliding rollers. Reference is made now to FIGS. 4D-4G, which are schematic illustrations of assembly for enabling stowing and deployment of camouflage elements, such as frames 402, in partial 3D view, extended scale view of the assembly in stowed and in deployed position and a single camouflage element with the respective parts of the stow and deployment assembly in 3D view, respectively, according to embodiments of the present invention.

FIG. 4A depicts one camouflage frame 402A with an adjacent camouflage frame 402B shown partially in its stowed position (denoted 402B$_S$) and partially in its deployed position (denoted 402B$_D$). FIG. 4E depicts in higher scale and partial view the structural elements and the relative position of camouflage frames 402A and 402B in the stowed position. According to embodiments of the invention sliding guiding rails 402A1 may be disposed along two sides of camouflage frame 402A on the facet facing camouflage frame 402B. Each of rails 402A1 may have made in it guiding track 402A2, for example in the form of a cut out (as seen in the drawing), a recess (not shown) or the like, so as to enable a free longitudinal movement of a sliding roller 402B1 disposed on a pivoted arm 402B2, that is connected via pivot to camouflage frame 402B in a pivot location 402B3. When in stowed position, camouflage frame 402B may be positioned substantially against camouflage frame 402A and in substantially full overlapping. In this status, roller 402B1 may reach close to the first end of guiding track 402A2 and pivoted arm 402B2 may be turned to allow this location. When in fully deployed position, as seen in FIG. 4F, camouflage frame 402B may be positioned aligned with and next to camouflage frame 402A thereby forming substantially a continuous camouflage area of two camouflage frames. In this position sliding roller 402B1 may come to rest position close to the second end of guiding track 402A2 and pivoted arm 402B2 may be positioned in an angle other than that of the stowed position and in some embodiments substantially opposite to that of the stowed position.

FIG. 4F depicts one camouflage frame 402, equipped with assembly for allowing an adjacent camouflage frame 402 to be stowed and deployed, according to embodiments of the present invention. Camouflage frame 402 may comprise a plurality of reflective elements 405 rigidly attached to a support frame 403. On two sides of support frame 403, which extend perpendicular to the longitudinal direction of reflective elements 405, there may be disposed two guiding rails 406 (similar to guiding rails 402A1 of FIGS. 4E, 4F, only one rail is shown so as to not obscure the drawing). Additionally, two roller assemblies 408 comprising, each, an arm 408A pivotally connected to frame 403 in location 408C at one end and to roller 408B at the other end. Rollers 408B are made to freely move, with minimal sideways freedom, in tracks 406A of rails 406 of an adjacent camouflage frame 402.

The sides of a vehicle may be camouflaged using camouflage elements such as camouflage frame 402, where stowing or deployment of the sets of camouflage elements may be done according to needs in the battlefield. As discussed above, additionally to sets camouflage elements such as set 400, sides of the vehicle may be covered, close to the ground, with flexible sheets of camouflage and the top line of the vehicle may be camouflaged with straight-line breaking elements, such as elements 160A, 160B and 160C of FIG. 1, which may remain in their deployed position all along the time of service of the vehicle in the battlefield. It should be noted that upper elements of the camouflage suit, such as elements 160, may also be deployed inclined so that their upper edge is more distant from the camouflaged vehicle than the lower edge, for example by inclination angle of β (as in FIG. 3B). When the front of the vehicle is involved, it is required to enable the driver of the vehicle, and in some cases also the commander of the vehicle, to have good enough view forwards of the vehicle and to some extent—to the sides of the vehicle. In some types of vehicles the doorway of soldiers entering or exiting the vehicle is located at the rear of the vehicle, which imposes constrains on the camouflage of the rear of the vehicle, as will be discussed herein below.

Figure 5A:
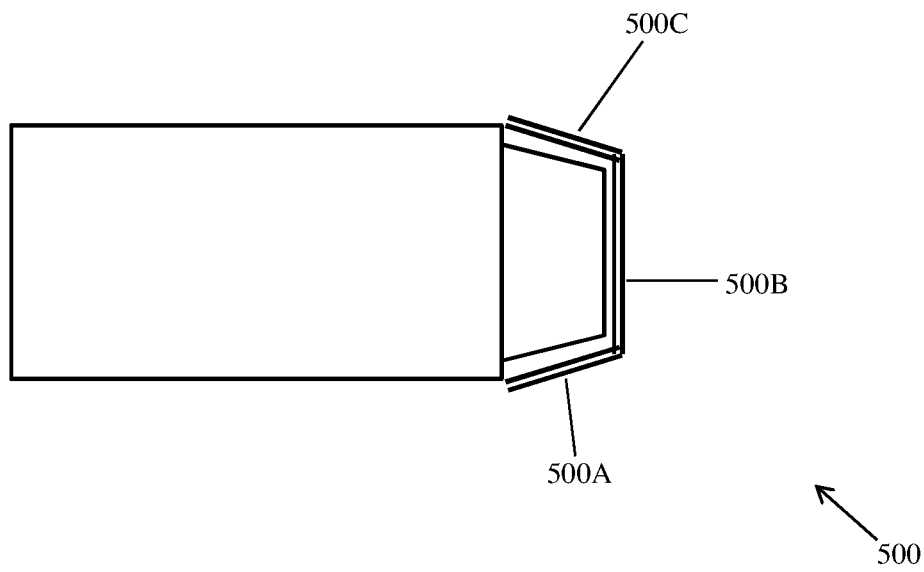
FIGS. 5A and 5B depict top view and stretched front view, respectively, of a front camouflage element of a camouflage system, according to embodiments of the present invention.
Figure 5B:
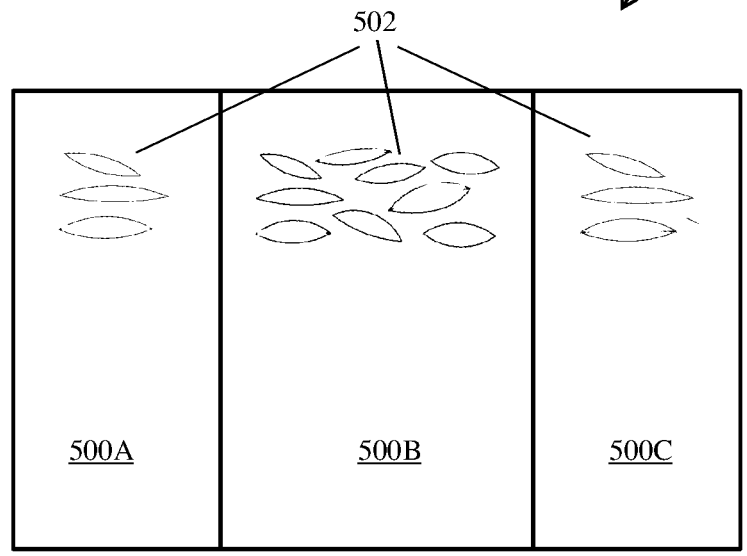

Reference is made now to FIGS. 5A and 5B which depict top view and stretched front view, respectively, of a front camouflage element 500, according to embodiments of the present invention. Front camouflage element 500 may comprise at least one portion, 500A, 500B or 500C, preferably 500B positioned in front of the driver and commander, made with viewing cutouts 502 made in the front camouflage portions. Cutouts 502 may have a random form location and size, however avoiding straight lines to provide maximal camouflage quality. The size, orientation, location and form of cutouts 502 may be designed to provide good enough continuous line of sight for the vehicle driver and, in case of need, for the commander of the vehicle. Cutouts 502 as seen in FIG. 5B are examples of optional form, size, location and number of cutouts. It would be apparent for one skilled in the art that different number of cutouts, with optionally different forms (not including straight lines as much as possible) and optionally different locations may be used for providing good-enough sight for the driver and/or the commander of the vehicle. Cutouts 502, as well as other see-through openings that may be required, may be covered with any material that provides enough transparency for light coming from the outside of the camouflage envelope to the inside, for enabling good enough see-though ability, while providing sufficient reflectivity for light coming from the outside to provide reflection of the outside to an observer located outside of the camouflage envelope. An example of requirements of transmission capability and reflection capability in various ranges of EM ranges, as required from such cover film may be presented in table 3:

TABLE 3

| | % range |
|---|---|
| Visible light transmitted | 7%-27% |
| Visible light reflected exterior | 44%-63% |
| Ultra-Violet block | 97%-99% |
| Total Solar Energy Rejected | 60%-85% |

In additional embodiments at least some of see-through openings 502 may be made with no covering material, taking advantage of the relatively small area of each opening, of the specially-designed form and location of each opening (planned to reduce visibility) as discussed above. It was proved in experiments carried out by the inventors that an opening 502 without cover leaves negligible visible print to a distant viewer.

It will be noted that the various planes of front camouflage element 500 may be disposed, each, with inclined angle towards the ground (i.e. the upper side of each of portions 500A, 500B, 500C is more distal from the vehicle than the lower side of the portion), thus providing reflection of the ground nearby the vehicle to a distant viewer looking at any one of portions 500A, 500B or 500C. For example, portions 500A, 500B and 500C may be inclined in an angle equal or close to β of FIG. 3B.

Figure 6A:
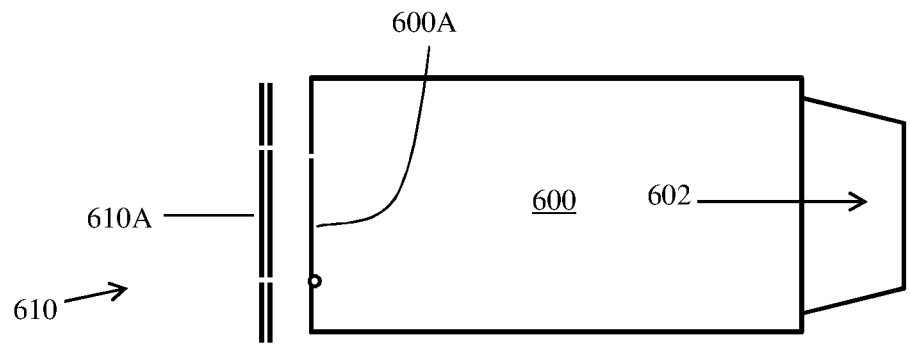
FIGS. 6A and 6B schematically depict top view of a rear camouflage element in closed and in opened positions, respectively, of a camouflage system, according to embodiments of the present invention.
Figure 6B:
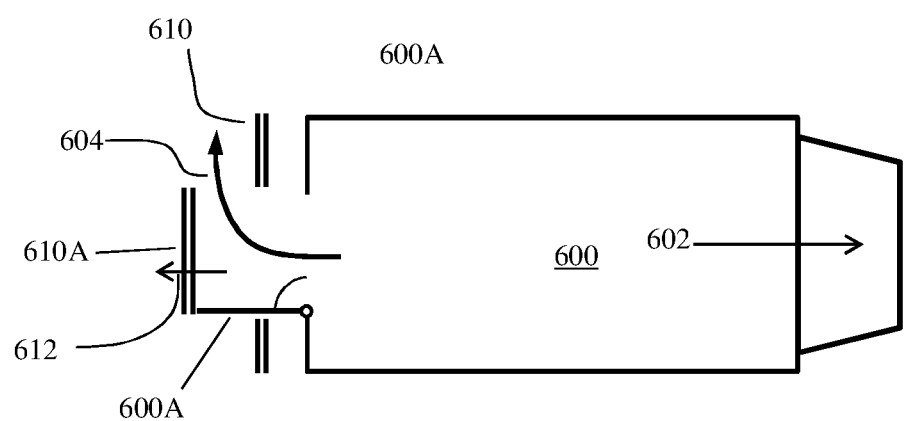

Reference is made now FIGS. 6A and 6B, which schematically depict top view of a rear camouflage element in closed and in opened positions, respectively, according to embodiments of the present invention. In order to enable passengers of vehicle 600, e.g. soldiers, troopers, etc. to unload from vehicle 600 while maintaining the level of camouflage provided to the rear of vehicle 600, rear camouflage portion 610 may have made in it an opening unit 610A, located substantially against rear door 600A of vehicle 600. When soldiers need to unload from vehicle 600 opening unit 610A may be moved backwards (with respect to the front movement direction 602 of vehicle 600) in direction 612*m* while maintaining the direction of perpendicular to its plane continuous, so that reflecting units disposed on opening unit 610A maintain their reflection direction continuous. Opening unit 610A may be moved backwards far enough to allow opening of door 600A and soldiers may unload from inside of vehicle 600 along exit path 604, while the camouflage effect of opening unit 610A is maintained substantially the same as before it was opened. When unloading of soldiers from vehicle 600 finishes door 600A may be closed and opening unit 610A may be moved back to its closed position. It should be noted that other openings in vehicle, for entrance/exit of persons, may be made with camouflage elements on them. Such camouflaged openings may be attached to the door of the respective opening in a way that when the door is opened to allow entry into or exit from the vehicle, the camouflage element attached to that door is moved with the door, either pivotally, maintaining its position with respect to the pivoted door, or otherwise, to maintain reflectance of the immediate vicinity against that door also when it is opened.

Moving of camouflage elements 402 from stowed to deployed position and back, moving opening unit 610A from closed position to open position and back and opening and closing door 600A may be done, each, manually or using any mechanical actuator known in the art, such as linear motor, motor and gear, hydraulic or pneumatic piston, and the like. For example for relatively small vehicle the weight of each camouflage element may be low enough to enable deployment and/or stowing manually, yet in larger vehicles the weight and/or size of each camouflage element may be too large to be handled manually, so in case stowing and deployment of elements of the camouflage is required mechanical aid may be required, as discussed above.

Figure 7:
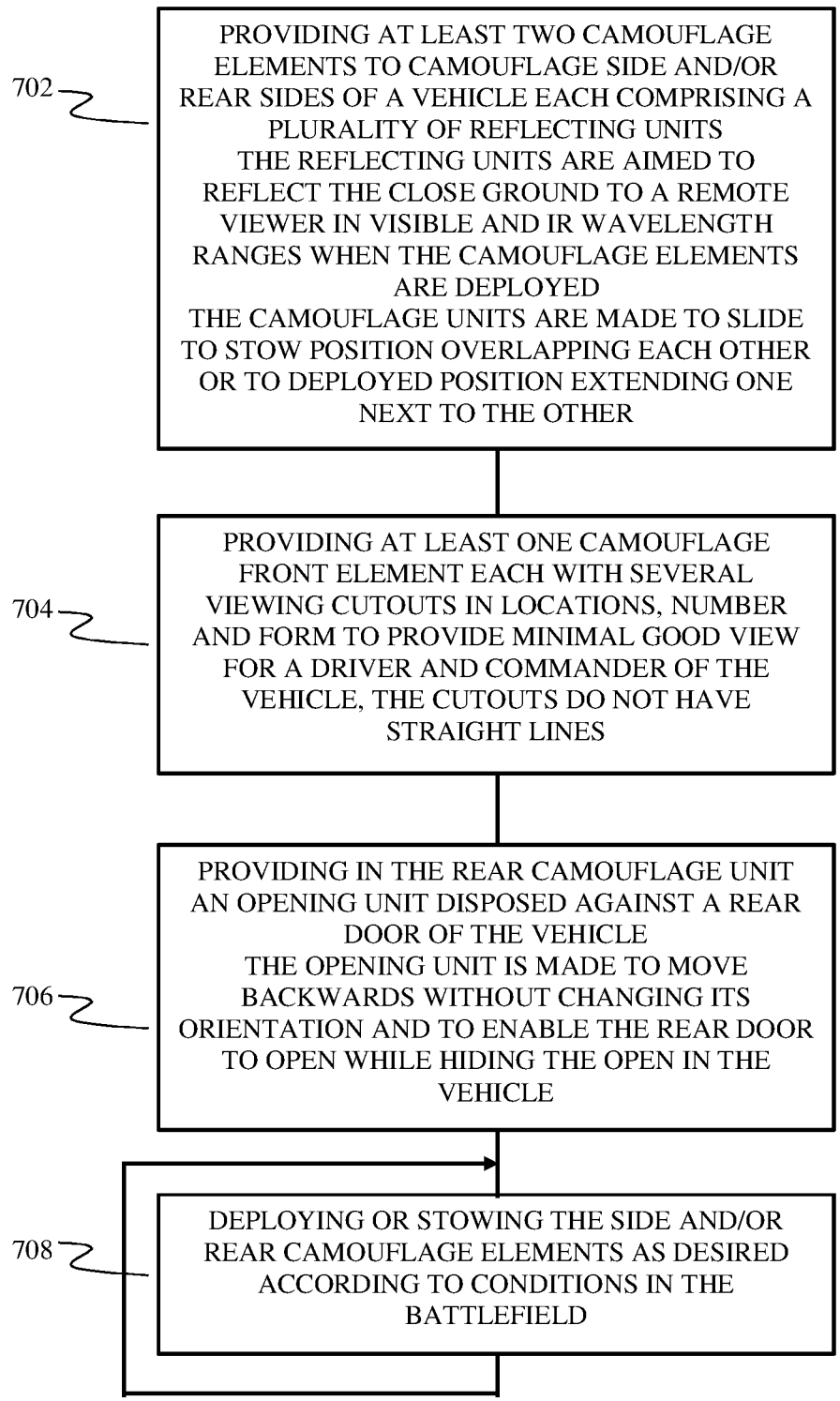
FIG. 7 is a flow diagram depicting a method of operation of a camouflage system for a vehicle, according to embodiment of the present invention.

Reference is made now to FIG. 7, which is a flow diagram depicting a method of operation of a camouflage system for a vehicle, according to embodiment of the present invention. In block 702, at least two camouflage elements are provided to camouflage side and/or rear sides of a vehicle each comprising a plurality of reflecting units, the reflecting units are aimed to reflect the close ground to a remote viewer in visible and IR wavelength ranges when the camouflage elements are deployed. Further, the camouflage units are made to slide to stow position overlapping each other or to deployed position extending one next to the other. In block 704 at least one camouflage front element is provided, each with several viewing cutouts in locations, number and form to provide minimal good view for a driver and commander of the vehicle, the cutouts do not have straight lines. In block 706 providing in the rear camouflage unit an opening unit disposed against a rear door of the vehicle, the opening unit is made to move backwards without changing its orientation and to enable the rear door to open while hiding the open in the vehicle. Finally, in block 708 the side and/or rear camouflage elements are deployed or stowed as desired according to conditions in the battlefield.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A camouflage system for thermal and visual camouflage of a movable object, comprising:
   at least two frames including a first frame and a second frame;
   a plurality of reflective elements connected to each of the at least two frames; and
   a folding and deploying mechanism, adapted to change a relative position of at least the first frame with respect to at least the second frame,
   wherein each of the reflective elements comprises reflective material disposed on at least one side of the reflective element and having reflectivity of at least 85 percent in a visual range and reflectivity in an electromagnetic (EM) wavelength range of 3-5 and 8-14 microns of at least 80 percent, and
   wherein all of the reflective elements are positioned in a predefined angle with respect to a vertical plane so that the upper edge of each element is more remote from the object than the lower edge of that element, the predefined angle is in a range of 6 to 25 degrees, and
   wherein the folding and deploying mechanism comprises:
   two guiding rails disposed each one along one of the sides of at least some of the at least two frames, and
   two rollers disposed each one on each of the sides of the at least some of the at least two frames, each of the rollers is adapted to roll along a corresponding rail of an adjacent frame, allowing each frame to be guided into a stowed position or into a deployed position with respect to an adjacent frame.

2. The camouflage system according to claim 1, wherein the first frame of the at least two frames is configured to change its relative position with respect to at least the second frame to increase overlapping areas of the first and second frames in the stowed position and to decrease the overlapping area of the first and second frames in the deployed position.

3. The camouflage system according to claim 1 wherein the reflective elements are rigid panels.

4. The camouflage system according to claim 1, wherein the camouflage system is movable with the object when it moves, and wherein the predefined angle is to maintain reflection of the nearby ground to a remote viewer when the object is moving.

5. The camouflage system according to claim 1 wherein a total seeable area of the face of the camouflage system that is facing away from the camouflaged object in the stowed position is between 0.2 and 0.7 of the total seeable area of the face of the camouflage system in the deployed position.

6. The system of claim 1, wherein each of the reflective elements comprises reflective material disposed on at least one side of the reflective element and having reflectivity of at least 95 percent in the visual range and reflectivity in the electromagnetic (EM) wave length range of 3-5 and 8-14 microns of at least 90 percent.

7. A camouflage system for camouflaging objects, comprising:
   at least one camouflage set of frames;
   a see-through panel; and
   a folding and deploying mechanism, adapted to change a relative position of at least a first frame with respect to at least a second frame,
   wherein the camouflage set of frames comprising:
   at least two frames; and
   a plurality of elongated reflective elements connected to each of the at least two frames,
   wherein each of the elongated reflective elements comprises a backing material and a reflective layer having reflectivity of at least 85 percent in a visual range and reflectivity in an electromagnetic (EM) wave length range of 3-5 and 8-14 microns of at least 80 percent, and
   wherein each of the reflective elements is positioned in a predefined angle with respect to a vertical plane so that the upper edge of each panel is more remote from the object than the lower edge of that panel, the predefined angle is in a range of 6 to 25 degrees, and
   wherein the see-through panel has a plurality of cut-outs, and
   wherein the folding and deploying mechanism comprises:
   two guiding rails disposed each one along one of the sides of the at least some of the at least two frames, and
   two rollers disposed each one on each of the sides of the at least some of the at least two frames, each of the rollers is adapted to roll along a corresponding rail of an adjacent frame, allowing each frame to be guided into a stowed position or into a deployed position with respect to an adjacent frame.

8. The system according to claim 7 wherein the first frame of the at least two frames is configured to change its relative position with respect to at least the second frame to increase overlapping of the first and second frames in the stowed position and to decrease the overlapping of the first and second frames in the deployed position.

9. The system according to claim 7 wherein a ratio between a total area of the cut-outs in the see-through panel and a total area of the see-through panel is in the range 0.15-0.5.

10. The system according to claim 7 wherein the elongated reflective elements are rigid elements.

11. The system according to claim 7, wherein the at least one camouflage set of frames is configured to camouflage a moving object, and wherein the predefined angle is to maintain ground reflection to a remote viewer when the moving object is moving across a sloped surface.

12. The system according to claim 7 wherein a total exposed face area of the camouflage sets of frames in the stowed position is between 0.2 and 0.7 of total exposed face area of the sets of frames in the deployed position.

13. The system according to claim 7 further comprising an openable portion in the camouflage system configured to camouflage an opening in the camouflaged object.

14. The system according to claim 13 wherein the object is a vehicle and the camouflage system comprising at least two camouflage sets of frames adapted to be positioned on two opposite sides of the vehicle, the see-through panel is adapted to be positioned in front of windshields of the vehicle and the openable portion of the camouflage system is positioned to camouflage at least one of: a passenger's and driver entrance to the vehicle.

15. The system according to claim 14 further comprising a camouflage skirt made of a flexible reflective material, and configured to be connected to the lower edge of at least one camouflage sets of frames, and to prevent at least some vehicle's heat from radiating from the lower portion of the vehicle.

16. The system according to claim 15 wherein the skirt is positioned in substantially the same predefined angle as the elongated reflective elements.

17. The system of claim 7 further comprising a heat ventilation opening at its top portion.

18. The system of claim 7, wherein each of the reflective elements comprises reflective material disposed on at least one side of the reflective element and having reflectivity of at least 95 percent in the visual range and reflectivity in the electromagnetic (EM) wave length range of 3-5 and 8-14 microns of at least 90 percent.

* * * * *